United States Patent

[11] 3,622,142

[72] Inventor Angelo Lorio
 161 Bleecker St., Brooklyn, N.Y. 11221
[21] Appl. No. 2,315
[22] Filed Jan. 12, 1970
[45] Patented Nov. 23, 1971

[54] CUSHIONED COIL SPRING
 4 Claims, 2 Drawing Figs.

[52] U.S. Cl. .................................................. 267/61
[51] Int. Cl. .................................................. F16f 1/12
[50] Field of Search .......................................... 267/61 S

[56] References Cited
UNITED STATES PATENTS
2,703,234 3/1955 Tapp .......................... 267/61 S
3,097,841 7/1963 Boyd .......................... 267/61 S
3,326,545 6/1967 Bache et al. ................. 267/61

Primary Examiner—James B. Marbert
Attorneys—Kenwood Ross and Chester E. Flavin

ABSTRACT: The combination with a coil spring of a semiresilient bumper interposed between adjacent convolutions of the spring, the bumper being wedge shaped and having a large dimension slightly exceeding that of the space between the convolutions for exerting a spreading action thereon.

PATENTED NOV 23 1971

3,622,142

INVENTOR.
ANGELO LORIO

BY  Kenwood Ross &
Chester E. Flavin
ATTORNEYS.

CUSHIONED COIL SPRING

BACKGROUND OF THE INVENTION

1. Field of the Invention

Means for rehabilitating worn and sagging coil springs and, in the case of automotive springs, for increasing riding comfort.

2. Description of the Prior Art

Inserts or the like for coil springs are known in the art. However, such have been difficult to apply and most have been rather complicated in their structures so as to be expensive in their manufacture.

SUMMARY OF THE INVENTION

It is a primary object of the invention to provide a simple, inexpensive means for rehabilitating worn and sagging coil springs, particularly those used in automotive vehicles, comprising a semiresilient bumper interposed between adjacent convolutions of the spring for spreading apart the convolutions engaged thereby.

In the operation of the invention the bumper will manifestly act to yieldably oppose relative movement toward each other of the adjacent coils of the spring engaging it, thereby strengthening the spring and effecting a stiffening action thereon at the point or points of application of the bumper.

Another object is to provide a means for stabilizing coil springs on the front or rear portions of a motor vehicle in such manner as to eliminate excessive bouncing of the vehicle wheels when traversing rough roads which bouncing causes an undesirable unbalanced condition.

DESCRIPTION OF THE PREFERRED EMBODIMENTS

Figure 1:
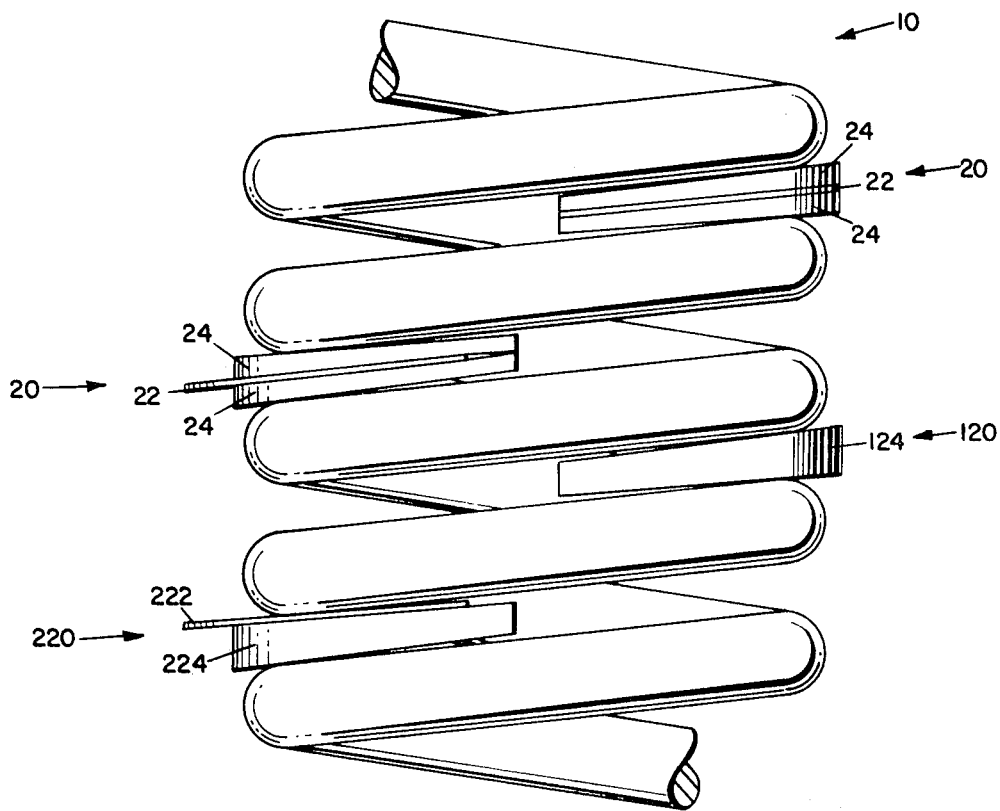
FIG. 1 is an elevational view of the cushioned coil spring embodying several forms of the invention.
Figure 2:
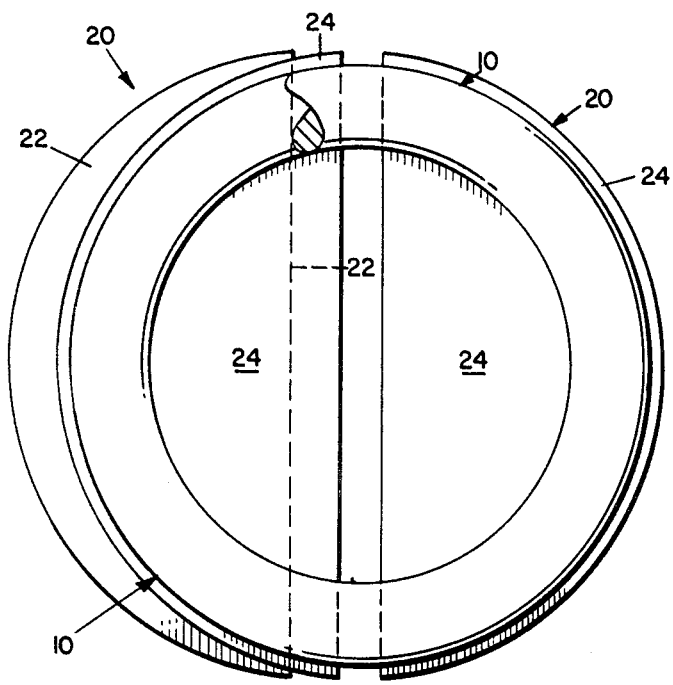
FIG. 2 is a top plan view thereof.

The numeral 10 indicates a coil spring of the type used in the front and/or rear suspensions of motor vehicles to provide smooth riding characteristics.

To alleviate the problem of spring sag caused by wear or age, bumpers are inserted between adjacent convolutions of the spring.

One form of bumper is generally indicated by 20 and comprises a flat metal plate 22 sandwiched between a pair of hard but resilient rubber elements 24, the metal imparting strength and rigidity and the rubber giving a cushioning effect to the bumper.

The bumper is preferably wedge shaped in cross section to facilitate its insertion between adjacent convolutions of the spring and is semicircular in plan so that it will extend only partially into the spring interior, making it possible to use several bumpers on a spring.

In practice, the rubber elements are inserted between convolutions and then the metal plate is driven between the rubber elements. In this manner metal plates of various thicknesses may be used depending upon the amount of spring sag.

Of course, the rubber elements and metal plate could be preassembled and driven between the convolutions as a single unit.

Another form of the invention is indicated by the numeral 120. Herein, the metal plate is omitted and a single wedge-shaped hard rubber element 124 is utilized. Such a bumper, while being less expensive in its manufacture, lacks the strength and rigidity of bumper 20.

Still another form of the invention is indicated by the numeral 220. Herein, a metal plate 222 is used in combination with a single wedge-shaped hard rubber element 224 to obtain the desired features of strength and rigidity without sacrificing resiliency.

In any of its forms, the bumper is designed to have a large dimension slightly exceeding the normal distance between adjacent convolutions of the spring to which it is to be applied; and is sufficiently resistant to compression that when it is interposed between the spring convolutions the latter will be slightly tensioned so as to tightly grip the bumper and securely hold it in place. The bumper is also sufficiently resistant to compression that where the spring is sagged and the booster will act when in place in the sagged portion of the spring to spread the adjacent convolutions to their normal relative position, or even slightly beyond such position if need be, and to so hold the convolutions under a load imposed thereon, thereby stabilizing the spring and compensating for weakness or sag therein at the portions thereof to which the bumper is applied.

I claim:

1. The combination with a coil spring of a semiresilient bumper interposed between adjacent convolutions of the spring, the bumper being wedge shaped in cross section and semicircular in plan and having a large dimension slightly exceeding that of the space between the convolutions for exerting a spreading action thereon.

2. The combination according to claim 1, wherein the bumper comprises a flat metal plate sandwiched between a pair of resilient rubber elements.

3. The combination according to claim 1, wherein the bumper comprises a resilient rubber element.

4. The combination according to claim 1, wherein the bumper comprises a flat metal plate and a resilient rubber element.

* * * * *